United States Patent [19]
Keyworth et al.

[11] Patent Number: 5,534,101
[45] Date of Patent: Jul. 9, 1996

[54] METHOD AND APPARATUS FOR MAKING OPTICAL COMPONENTS BY DIRECT DISPENSING OF CURABLE LIQUID

[75] Inventors: Barrie P. Keyworth; James N. McMullin, both of Edmonton, Canada

[73] Assignee: Telecommunication Research Laboratories, Edmonton, Canada

[21] Appl. No.: 204,517

[22] Filed: Mar. 2, 1994

[51] Int. Cl.⁶ ............................................. B32B 31/00
[52] U.S. Cl. .......................... 156/244.12; 156/244.17; 156/275.5; 385/123; 385/124; 385/146; 264/1.1; 264/1.24; 264/1.27; 264/1.29; 264/1.36; 264/1.38; 264/1.6; 264/1.7
[58] Field of Search ................. 156/275.5, 244.12, 156/244.17; 385/123, 124, 146; 264/1.1, 1.24, 1.27, 1.29, 1.36, 1.38, 1.6, 1.7

[56] References Cited

U.S. PATENT DOCUMENTS

| | | | |
|---|---|---|---|
| 4,693,543 | 9/1987 | Matsumura et al. | 350/96.11 |
| 4,921,321 | 5/1990 | Weidman | 350/96.12 |
| 4,934,774 | 6/1990 | Kalnitsky et al. | 350/96.12 |
| 4,958,895 | 9/1990 | Wells et al. | 350/96.12 |
| 5,054,872 | 10/1991 | Fan et al. | 385/130 |
| 5,110,514 | 5/1992 | Soane . | |
| 5,134,681 | 7/1992 | Ratovelomanana | 385/130 |
| 5,138,687 | 8/1992 | Horie et al. | 385/129 |
| 5,170,461 | 12/1992 | Yoon et al. | 385/130 |
| 5,178,978 | 1/1993 | Zanoni et al. | 430/11 |
| 5,185,835 | 2/1993 | Vial et al. | 385/49 |
| 5,196,041 | 3/1993 | Tumminelli et al. | 65/30.1 |
| 5,208,136 | 5/1993 | Zanoni et al. | 430/290 |
| 5,208,884 | 5/1993 | Groh et al. | 385/46 |
| 5,224,197 | 6/1993 | Zanoni et al. | 385/130 |
| 5,231,682 | 7/1993 | Khavand | 385/42 |
| 5,231,683 | 7/1993 | Hockaday et al. | 385/49 |
| 5,303,141 | 4/1994 | Batchhelder . | |

OTHER PUBLICATIONS

Laser direct writing of channel waveguides using spin-on polymers, Robert R. Krchnavek, Gail R. Lalk, Davis H. artman, J. Appl. Phys. 66(11) 1 Dec. 1989, pp. 5156–5160.
Radiant cured polymer optical waveguides on printed circuit boards for photonic interconnection use, Hartman, et al., Appl. Opt., 28,40 1 Jan. 1989, pp. 40–47.
"Luminite Lettering Compound Adds Colored Glow to Signs" *Technology Today*, Nov. 1993.

*Primary Examiner*—Chester T. Barry
*Attorney, Agent, or Firm*—Anthony R. Lambert

[57] ABSTRACT

A method of forming an optical element on the surface of a substrate by ejecting a curable light guide forming liquid from a nozzle onto the substrate and curing the curable light guide forming liquid. A waveguide may be formed by moving the nozzle in a linear pattern over the surface of the substrate during ejection of the liquid from the nozzle. Curing the liquid may include exposing the liquid to ultraviolet radiation, and the radiation may be applied to only a small portion of the liquid. A multilayered waveguide may be formed by ejecting a further light guide forming liquid onto the first and curing it. A core and cladding may be formed simultaneously by ejecting core forming liquid from an inner tube and cladding forming liquid from an annulus about the inner tube. The waveguide may be formed in a groove, and a splitter may be formed by branching a second waveguide from a first, or by laying out two parallel waveguides and connecting them. Apparatus for forming a light guide on a substrate includes an xy movable support for the substrate, and a container having a nozzle, the nozzle being movable in relation to the substrate, and a dispenser to regulate dispensing of liquid from the container. Liquid curing radiation may be provided through a source of UV light. The nozzle may be formed of a first central tube and a second outer tube disposed about the first central tube to form an annulus between them. A microlens may be formed by holding the nozzle stationary during dispensing.

29 Claims, 11 Drawing Sheets

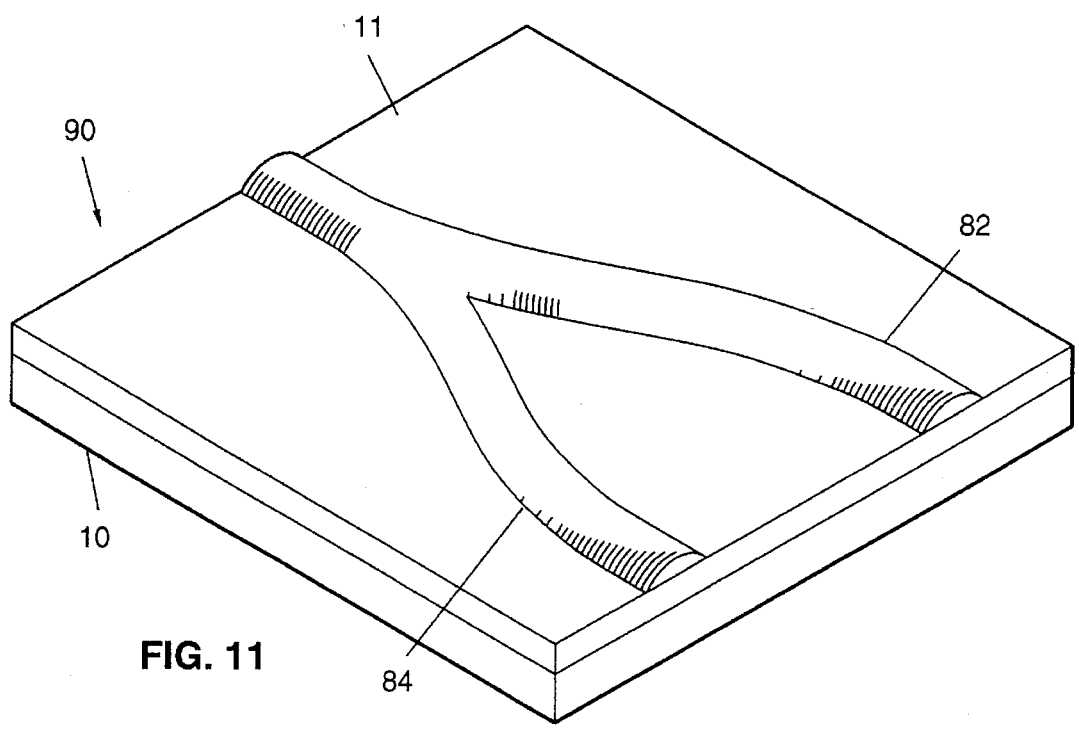
FIG. 11
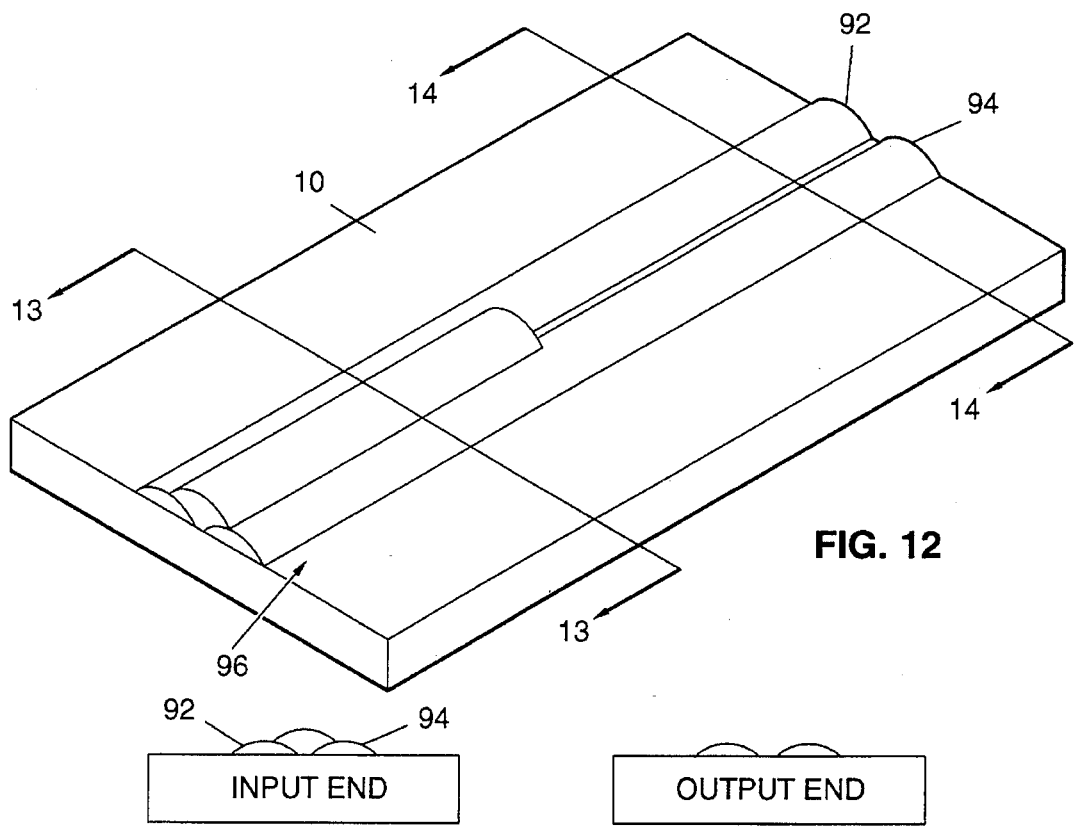
FIG. 12
FIG. 13      FIG. 14

METHOD AND APPARATUS FOR MAKING OPTICAL COMPONENTS BY DIRECT DISPENSING OF CURABLE LIQUID

FIELD OF THE INVENTION

This invention relates to methods and apparatus for making integrated optical light guides on substrates.

CLAIM TO COPYRIGHT

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

A microfiche appendix consisting of two microfiche and 107 frames forms a part of this patent document. The microfiche appendix contains software used to control apparatus used in an implementation of the method of the invention.

BACKGROUND OF THE INVENTION

Hybrid integration of photonic and electronic components provides a lower cost alternative to fully monolithic integration. Individual components can be fabricated using preferred materials and techniques and then assembled on a common substrate or carrier. Optical light guides are required for broadband interconnections between the optical and/or optoelectronic devices. To be economically viable these light guides must be low cost and easily manufactured.

As used in this specification, a light guide is a material that is at least partially transparent to light and is capable of guiding light, as for example a lens or a waveguide.

An optical waveguide is comprised of a region of high refractive index material surrounded by materials of lower refractive index. Optical waveguides have been fabricated on a variety of substrates including semiconductors, glass, Lithium Niobate and the like. They are typically formed by first preparing a low-loss planar slab and then defining the waveguide regions using one of a variety of techniques. These techniques include: (1) wet chemical etching, laser-assisted etching, or reactive ion etching (all of which remove material in specific areas to form waveguide ridges); (2) ion bombardment or ion exchange, which create a molecular disorder to alter the refractive index; (3) photopolymerization of organic polymers; (4) photobleaching of organic dyes in polymers; and (5) injection molding.

The processes described above typically require the use of a mask which contains the layout of the waveguides. Modifications to the layout therefore require the fabrication of a new mask which is time consuming and adds expense. Computer-controlled direct write systems are more suitable for rapid prototyping of optical waveguides. Several groups have reported laser writing techniques which selectively cure, through a photochemical process, waveguide regions from a film of liquid polymer [see Krchnavek et al., Laser direct writing of channel waveguides using spin-on polymers, J. of Applied Physics, vol. 66, no. 11, 1989]. These systems require that a uniform film be first deposited over the entire substrate. Following the laser writing procedure, the remaining unexposed material is removed. The dimensions of the waveguide are determined by the size of the focused spot used to cure the material. To achieve small features the light source must produce a good quality beam (near Gaussian) which can be tightly focused. This typically requires the use of an expensive UV laser source. In addition, the incident energy level of the light source must be carefully controlled in order to rapidly cure the waveguides without degrading the optical properties.

SUMMARY OF THE INVENTION

The inventors have found a simple yet surprisingly effective technique of forming optical elements on a surface of a material. In one aspect of the invention, there is provided a method of forming an optical light guide on the surface of a substrate by ejecting a first curable light guide forming liquid from a nozzle onto the substrate and curing the first curable light guide forming liquid to form an optical element on the surface of the substrate. A waveguide may be formed by moving the nozzle in a linear pattern over the surface of the substrate while ejecting the first curable light guide forming liquid from the nozzle. Curing the first curable light guide forming liquid may include exposing the curable light guide forming liquid to ultraviolet (UV) radiation, and the radiation may be applied to only a small portion of the liquid. A multilayered waveguide may be formed by ejecting a second light guide forming liquid onto the first and curing it. A core and cladding may be formed simultaneously by ejecting core forming liquid from an inner tube and cladding forming liquid from an annulus about the inner tube. The light guide may be formed in a groove or on a planar surface, and a splitter may be formed by branching a second waveguide from a first, or by laying out two parallel waveguides and connecting them.

In a further aspect of the invention, there is provided apparatus for forming a light guide on a substrate. The apparatus preferably includes an xy movable support for the substrate, and a container having a nozzle, the nozzle being movable in relation to the substrate, and a dispenser to regulate dispensing of liquid from the container. Liquid curing radiation may be provided through a source of UV light. According to one aspect of the invention, the nozzle may be formed of a first central tube and a second outer tube disposed about the first central tube to form an annulus between them, the container having separate compartments, one connected to the first central tube and the other connected to the second outer tube.

The apparatus and method allow selective writing of optical light guides. The core of the light guide may be dispensed and cured in a single step with no further processing required (ie. no removal of excess material). The light guide dimensions are determined primarily by the volume of liquid dispensed per unit length of the light guide. An inexpensive light source may therefore be used for curing since there is no requirement for a small focused spot. The same apparatus is also used to form refractive microlenses by depositing small droplets of photocurable polymer.

In the case of planar substrates, the light guides are formed by selective deposition which eliminates the need for preforms, etching, or lift-off. No processing masks are required since the light guide layouts are defined by scalable software routines. This makes the technique particularly attractive for rapid prototyping applications. In comparison with other direct-write schemes, the technique eliminates the requirement for spin coating and excess polymer removal and replaces the ultraviolet laser with an inexpensive light source. Waveguides may also be formed by dispensing a light guide forming liquid into a v-groove in the substrate. These polymer-filled v-groove waveguides require the use of anisotropic etching to form the grooves but offer better control of waveguide cross-section and compatibility with fiber alignment grooves.

BRIEF DESCRIPTION OF THE DRAWINGS

There will now be described preferred embodiments of the invention, with reference to the drawings, by way of illustration, in which like numerals denote like elements and in which:

FIG. 11 is a perspective view of a Y-splitter made according to the invention;

FIG. 12 is a perspective view of a parallel waveguide splitter;

FIG. 13 is a cross-section along the line 13—13 in FIG. 12;

FIG. 14 is a cross-section along the line 14—14 in FIG. 12;

DETAILED DESCRIPTION OF PREFERRED EMBODIMENTS

Figure 1:
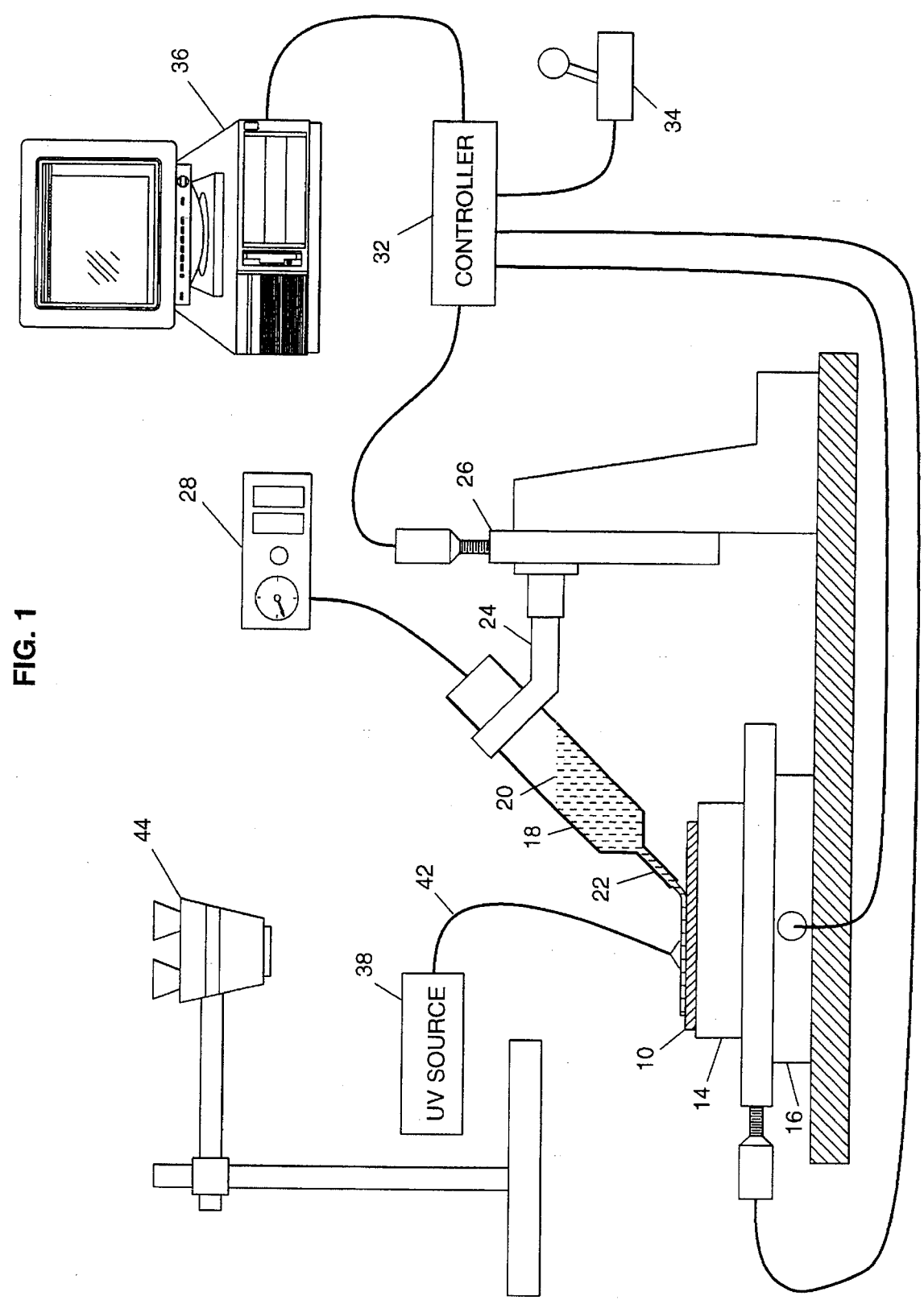
FIG. 1 is a schematic showing an embodiment of an apparatus according to the invention.
Figure 2:
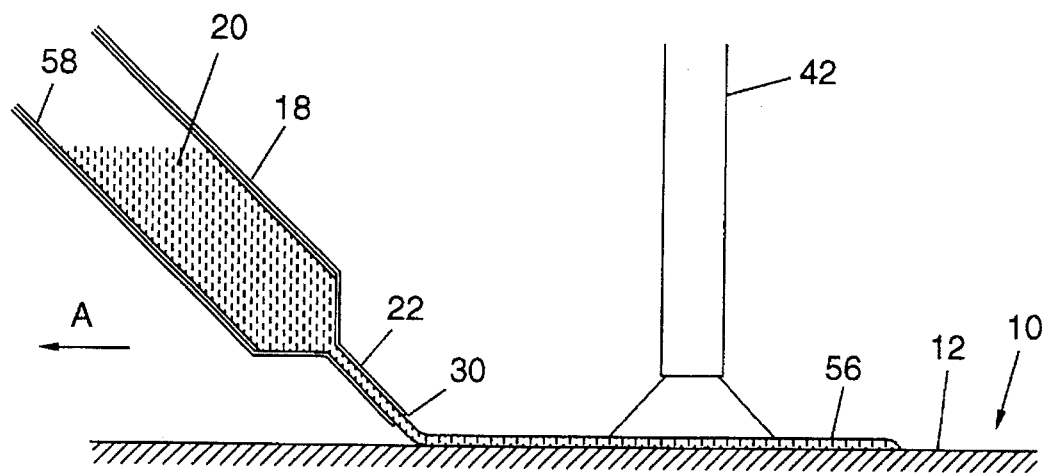
FIG. 2 is a side view of a dispensing tip in the process of carrying out an embodiment of the method of the invention.
Figure 3:
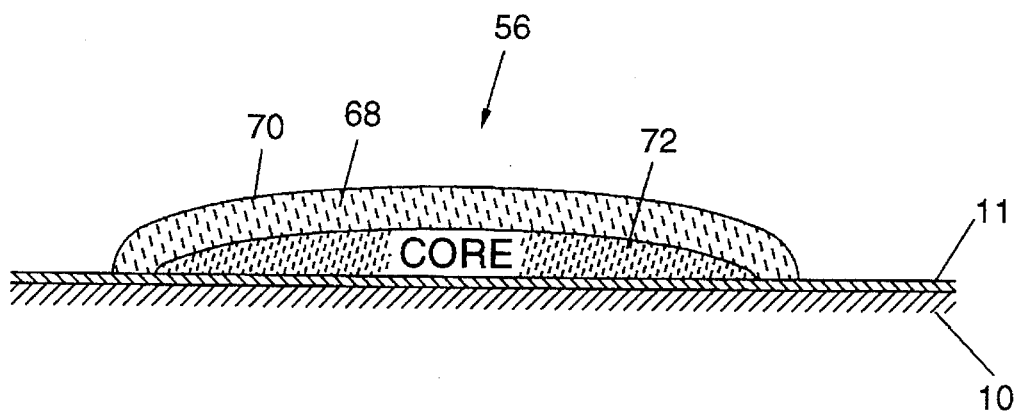
FIG. 3 is a cross-sectional schematic illustrating a waveguide made according to the method of the invention illustrated in FIG. 2.

Referring to FIGS. 1, 2 and 3, there is shown an apparatus according to the invention for forming a light guide on a substrate 10. The substrate 10 may be silicon dioxide, glass, lithium niobate or any semi-conducting material used for making electronic components. The substrate has an upper planar surface 12, and rests on a support 14 forming part of an xy translation stage 16. A container 18 containing curable light guide forming liquid 20, having a nozzle 22, is mounted on an arm 24 of a z-axis actuator 26, which is lowered to dispense liquid and raised during re-positioning of the nozzle. The z-axis actuator 26 and xy translation stage 16 together form a means for controllably changing the spatial relationship of the nozzle to the substrate. The z-axis actuator 26 regulates the height of the nozzle above the substrate 10, while the xy translation stage regulates the horizontal location of the nozzle 22 on the substrate 10.

Flow of liquid 20 from the container 18 and nozzle 22 is regulated by means of a dispenser 28. The volume of curable light guide forming liquid dispensed per unit length of light guide, and hence the width of the light guide, is controlled through a combination of translation speed and pressure in the dispenser. The greater the speed, and/or the lower the pressure, the narrower the light guide. The dispenser operates by applying a regulated air pressure to the surface of the liquid contained in the syringe, forcing the liquid through the dispensing tip 30 of the nozzle 22. The xy translation stage 16 and z-axis actuator 26 are controlled by controller 32. Control signals for the controller 32 may be supplied by joystick 34 or by computer 36, for example controlled according to the program filed with the Patent and Trademark Office as a software appendix. The curable light guide forming liquid 20 is preferably cured using liquid curing radiation, such as from UV source 38 with light guide 42 for delivering the light to the desired location. The source 38 of liquid curing radiation may also be moved over the surface of the substrate in a linear pattern by using the xy translation state. A microscope 44 may be used to inspect the manufacturing process.

Figure 5:
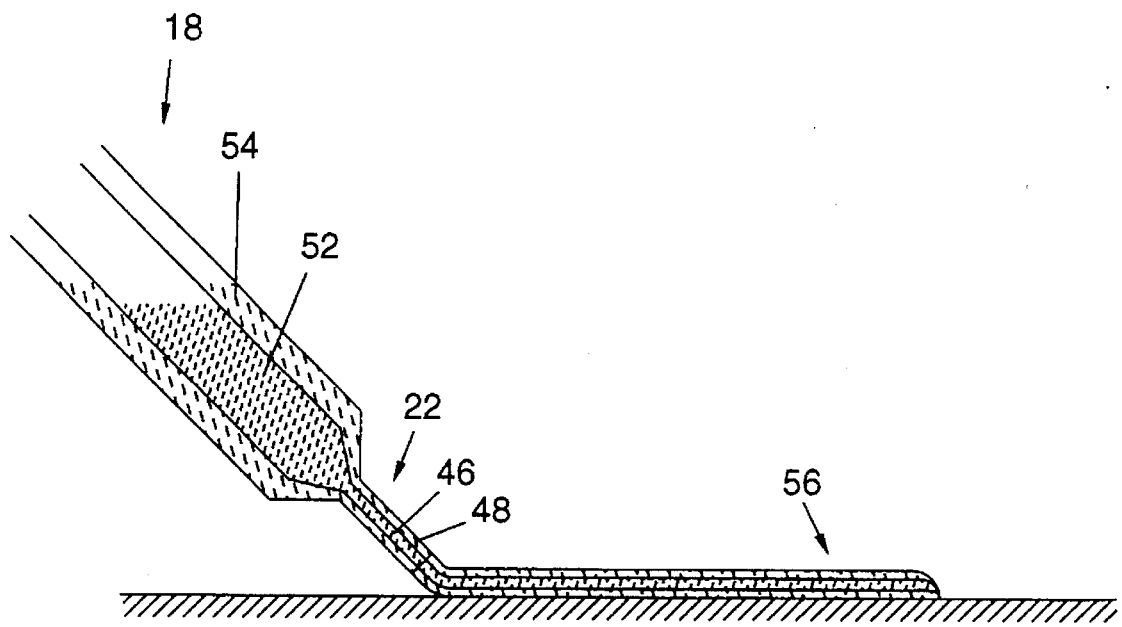
FIG. 5 is a side view of a dispensing tip in the process of carrying out a further embodiment of the method of the invention.

The nozzle 22 is preferably formed from a tube of internal diameter less than about 100 μm (as for example 50 μm), but may consist simply of a small aperture in a container. A syringe having barrel inside diameter 1 cm with a 50 μm inside diameter tip has been found successful. A capillary tube may also be used as the nozzle 22 with liquid supplied from a pump (not shown). In such an instance, only the capillary need be moved, rather than the entire nozzle. An alternative embodiment is shown in FIG. 5, in which the nozzle 22 is formed of a first central tube 46 and a second outer tube 48 disposed about the first central tube 46 to form an annulus between them. The container 18 has separate compartments, one compartment 52 connected to the first central tube 46 and the other compartment 54 connected to the second outer tube 48.

The curable light guide forming liquid 20 is preferably a UV curable polymer (n between 1.5 and 1.6) such as Norland™ 68 optical adhesive (n=1.54) that cures with low shrinkage when exposed to ultraviolet light. In this patent document, a curable light guide forming liquid is a liquid having the property that under known conditions, as for example exposure to ultraviolet light, it may undergo reactions that solidify the liquid to yield a material that is at least partially transparent to light and that is capable of guiding light, which typically requires only that the liquid have a boundary and be in a medium with lower index of refraction.

The index of refraction of the polymer or other curable light guide forming liquid, should be greater than the index of refraction of the substrate or a cladding layer on the substrate. A suitable cladding material is silicon dioxide having an index of refraction of n=1.46. If the substrate 10 is unsuitable as a cladding material, a buffer layer 11 may be formed by vapour deposition of silicon dioxide on the substrate 10. The buffer layer 11 or the substrate itself thus acts as the lower cladding layer for a waveguide deposited on the substrate. Alternatively, a two-stage dispensing technique may be used in which a low index cladding forming material is first dispensed and cured and a second higher index light guide forming liquid is then deposited on top.

A light guide may be formed on the substrate, for example using the apparatus of the invention, by ejecting the curable light guide forming liquid 20 from the nozzle 22 onto the substrate 10 and curing the curable light guide forming liquid 20 to form an optical element. If the nozzle 22 is not moved during dispensing of the liquid 20 from the nozzle 22, then a lens may be formed. For waveguides, however, the nozzle 22 is moved in a linear pattern (as for example shown in FIG. 2, with the arrow A showing direction of movement) over the surface 12 of the substrate 10 to form a waveguide 56. The liquid 20 must be cured to a solid state, thus forming a waveguide having the linear pattern. Curing is preferably achieved by exposing the liquid 20 to ultraviolet radiation immediately after dispensing of the liquid 20 from the nozzle 22. The inside of the container 18 should be coated with a UV blocking material 58 to prevent curing of the liquid 20 inside the container 18 during dispensing.

Figure 4:
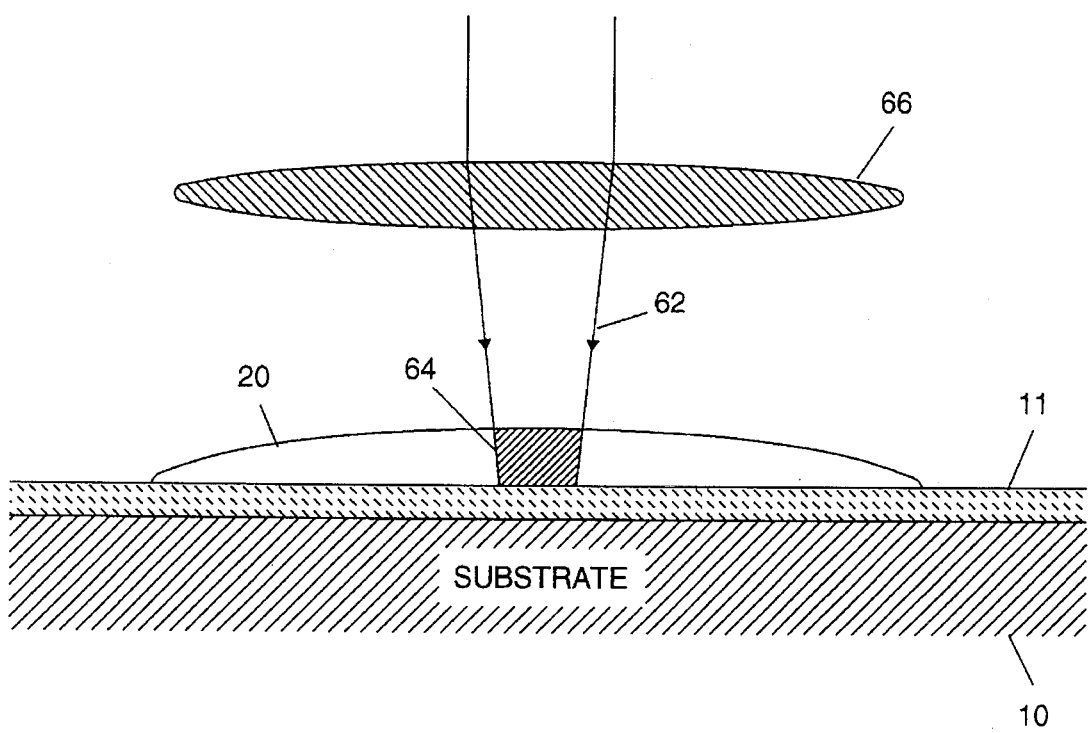
FIG. 4 is a cross-section illustrating a manner of carrying out a curing step in the method of the invention.

As shown in FIG. 4, a light guide may be formed by exposing only a central portion of the liquid 20 to curing radiation 62 thus forming a narrow strip waveguide region 64. The radiation 62 may be focused using a lens 66 to reduce the size of the cured region. The uncured remainder of the liquid 20 may be removed using conventional solvents.

Figure 6:
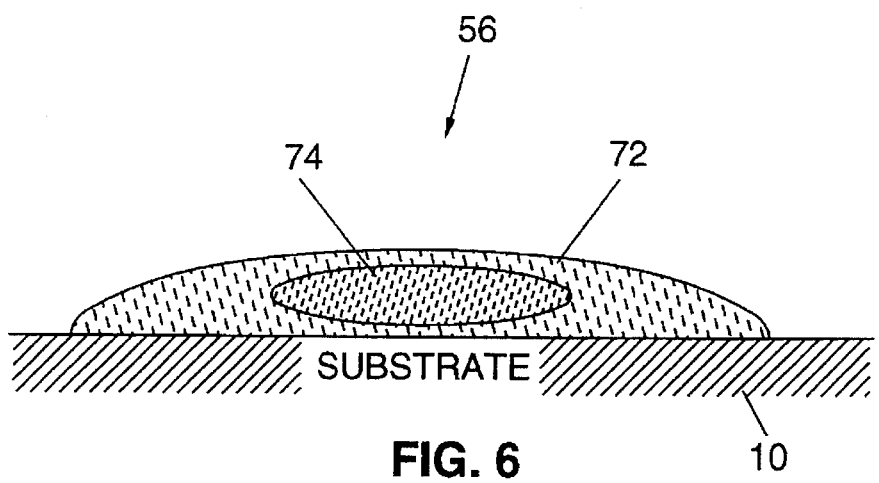
FIG. 6 is a cross-sectional schematic illustrating a waveguide made according to the method of the invention illustrated in FIG. 5.

As shown in FIG. 3, a cladding 68 for the waveguide 56 may be formed by ejecting a second curable light guide forming liquid 70 onto the waveguide core 70. The cladding liquid 70 should be formed of a material with lower refractive index than the core 72. If the substrate 10 does not have suitable optical properties, a buffer layer 11 may be used to provide the necessary optical properties. As illustrated in FIGS. 5 and 6, a waveguide 56 may be formed by simultaneously dispensing a core 74 and cladding 76 using a nozzle 22 having central aperture 46 and an annular aperture 48.

Figure 7:
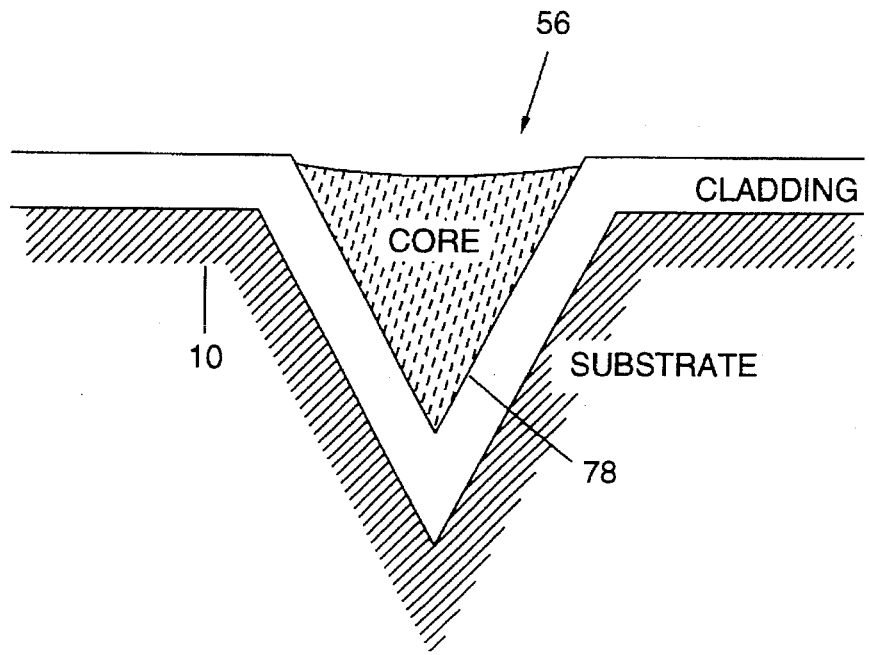
FIGS. 7 and 8 illustrate waveguides made in accordance with the invention in which the waveguides are formed in grooves in a substrate.
Figure 8:
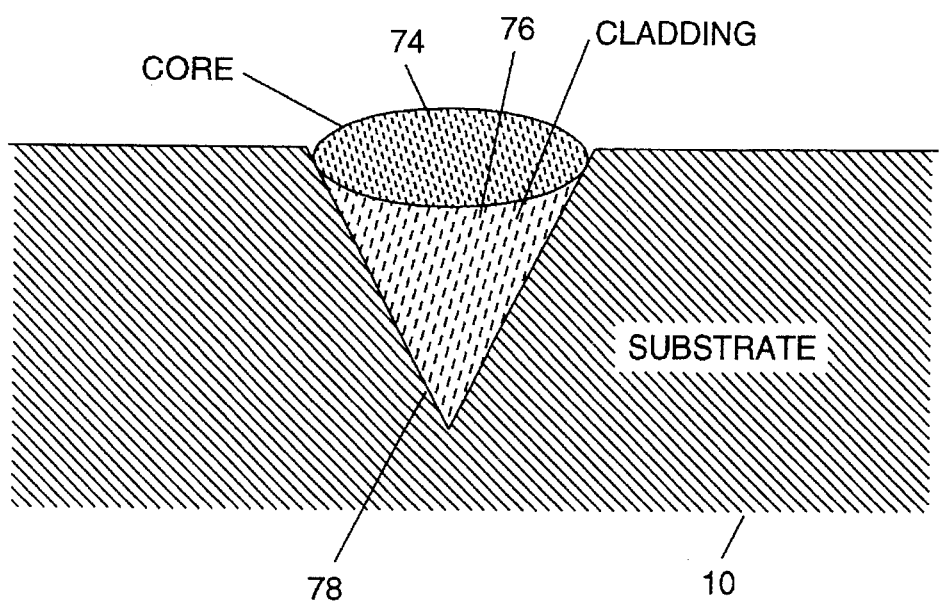

As shown in FIGS. 7 and 8, an optical element may be formed by directly ejecting a curable light guide forming liquid 20 into a groove 78 formed, as by anisotropic etching, in a semiconductor substrate 10. Such a groove 78 may be constructed with sidewalls defined by crystal planes and are therefore extremely smooth. The core liquid can be dispensed directly into the v-groove if the substrate is transparent and has a lower refractive index. If this is not the case, a suitable cladding layer must be formed on the surface of the substrate and on the v-groove walls. In FIG. 7, the optical element is a waveguide 56, formed of a core by moving the nozzle 22 along the groove 78, while in FIG. 8, a cladding 76 of curable cladding forming liquid (lower index of refraction) is first ejected into a groove 78, and then a core 74 (higher index of refraction) deposited on top of the cladding 76, in each case by moving the nozzle 22 along the groove while dispensing liquid.

Figure 9:
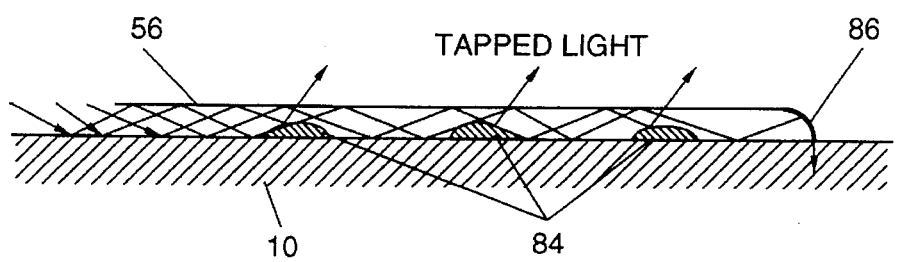
FIG. 9 is a side view illustrating the manner of propagation of light in a waveguide made according to the invention.

As shown in FIG. 9, a light guide may be formed with reflective out-of-plane taps 84. Taps 84 are formed by dispensing drops of reflective material prior to dispensing the waveguide 56. Some of the light propagating in the waveguide 56 will hit the reflective bumps 84 and will radiate upwards. Equal amounts of optical power can be tapped out of the waveguide by grading the size of the bumps; increasing their size as the power in the guide drops.

Figure 10:
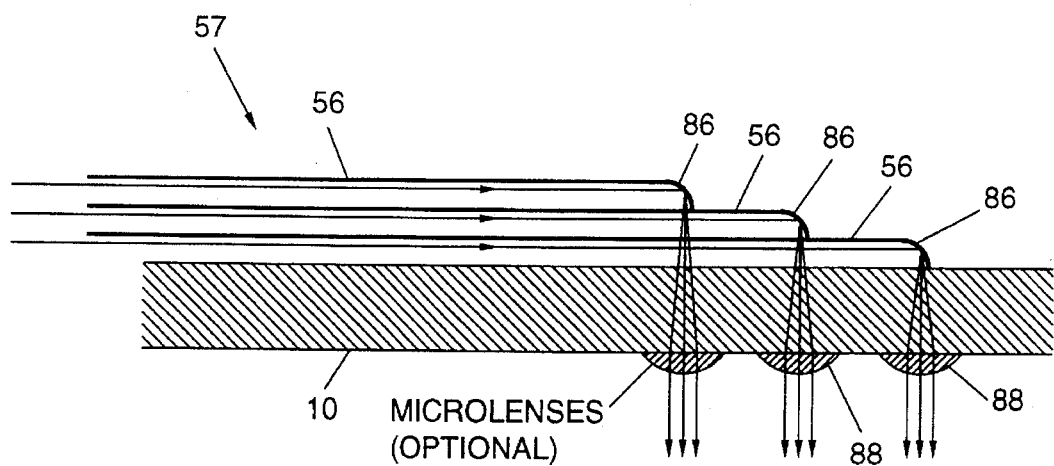
FIG. 10 is a cross-section showing multilayered waveguides made according to the invention.

As shown in FIG. 10, a waveguide 57 may be formed in layers and have staggered reflective ends 86 for out-of-plane coupling. Each waveguide layer 56 is formed by dispensing curable light guide forming liquid in a linear pattern and then curing the liquid. Each successive waveguide layer follows the same path to create the stack. Small lenses 88 may be formed on the under side of the substrate by turning the substrate over and ejecting the curable light guide forming liquid without moving the nozzle 22. Lenses may be stacked in order to control the lens profile and thus the f-number of the lens.

If a single polymer is used to form a stacked multilayered waveguide, the result is a composite waveguide cross-section with increased height-to-width ratio that couples light more efficiently to optical fiber. Multilayered waveguides may also involve the use of two or more polymers of different refractive index. In this case a lower index polymer is first deposited, followed by a higher index core material. Finally, a second cladding layer may be deposited over the waveguide core in order to reduce the waveguide propagation losses and protect it from damage.

As shown in FIG. 11, a branched waveguide pattern or splitter 90 may be formed by first dispensing one arm 82 of the branch and then immediately dispensing the other arm 84. A silicon dioxide layer 11 forms a smooth lower cladding. Each branch is formed of an S-bend waveguide.

As shown in FIGS. 12, 13 and 14, a parallel waveguide splitter may be formed by dispensing two closely spaced but separated straight linear waveguides 92 and 94 on a substrate 10 using the same liquid 20 and then curing them. The input ends (FIG. 13) are then joined by dispensing the same light guide forming liquid between and connecting the two waveguides 92 and 94 in like manner, to yield connected waveguides at one end (FIG. 13) and divided waveguides at the other end (FIG. 14).

To fabricate a waveguide branch the dispensing tip 30 of the nozzle 22 is first moved to a starting position, the tip 30 is lowered to a height either in contact with, or just above, the substrate surface. The vertical position of the substrate surface may be memorized by the computer 36 and reset by the user. Dispensing of liquid is preferably set to begin when the tip 30 reaches the bottom of its travel and the substrate 10 is then positioned through a linear pattern that may be specified in software or controlled through movement of the joystick 34. When the end point of the linear pattern of waveguide 56 is reached the dispenser is turned off and the tip 30 is raised. The dispense tip 30 can then be re-positioned to another location to begin another waveguide branch. For optimal results the dispense tip 30 should be angled as shown in FIG. 2, preferably at 45°. Use of an ultraviolet light source increases the height-to-width ratio of the waveguide 56 (allowing less settling time for the liquid) and prevents contaminants from being introduced while the waveguide 56 is in the liquid state. The curing light is confined to a spot several millimeters in diameter in close proximity to the dispensing tip 30. The controller board 32 may be used to turn the light on or off.

During dispensing the tip 30 should be either in contact with the substrate surface or slightly above it. The curing source should be placed so that the edge of the UV spot is within a few millimeters of the dispensing tip but is not close enough to cause clogging. The light spot should be large enough so that when forming bends the liquid waveguide still passes under the UV light. The core material must be optically transparent and have a higher refractive index that the surrounding material. If the substrate 10 is not transparent at the desired optical wavelength or has a high refractive index, a buffer layer 11 must be used between the core and the substrate in order to prevent excessive waveguide losses (See FIGS. 3 and 4). The upper cladding material may be air or a low index curable liquid. The latter is preferred since it protects the waveguide from dirt and/or damage. The height-to-width ratio of the waveguide depends on the viscosity of the liquid, the properties of the surface layer, and the time elapsed before curing. The embodiment of FIG. 4 is suitable for forming small waveguides suitable for single mode operation, and can be fabricated by selectively dispensing the liquid and then using a focused UV beam to cure only the middle portion. This eliminates the need for the spin coating step which is used in the standard laser writing technique and replaces it with a more selective process.

Complex structures such as 1×N or N×N splitters and combiners may be fabricated by repetitive movement of the dispenser tip 30, which makes the system amenable to automation. If an input and output point are specified, the location of the waveguide branches may be automatically calculated.

Figure 15:
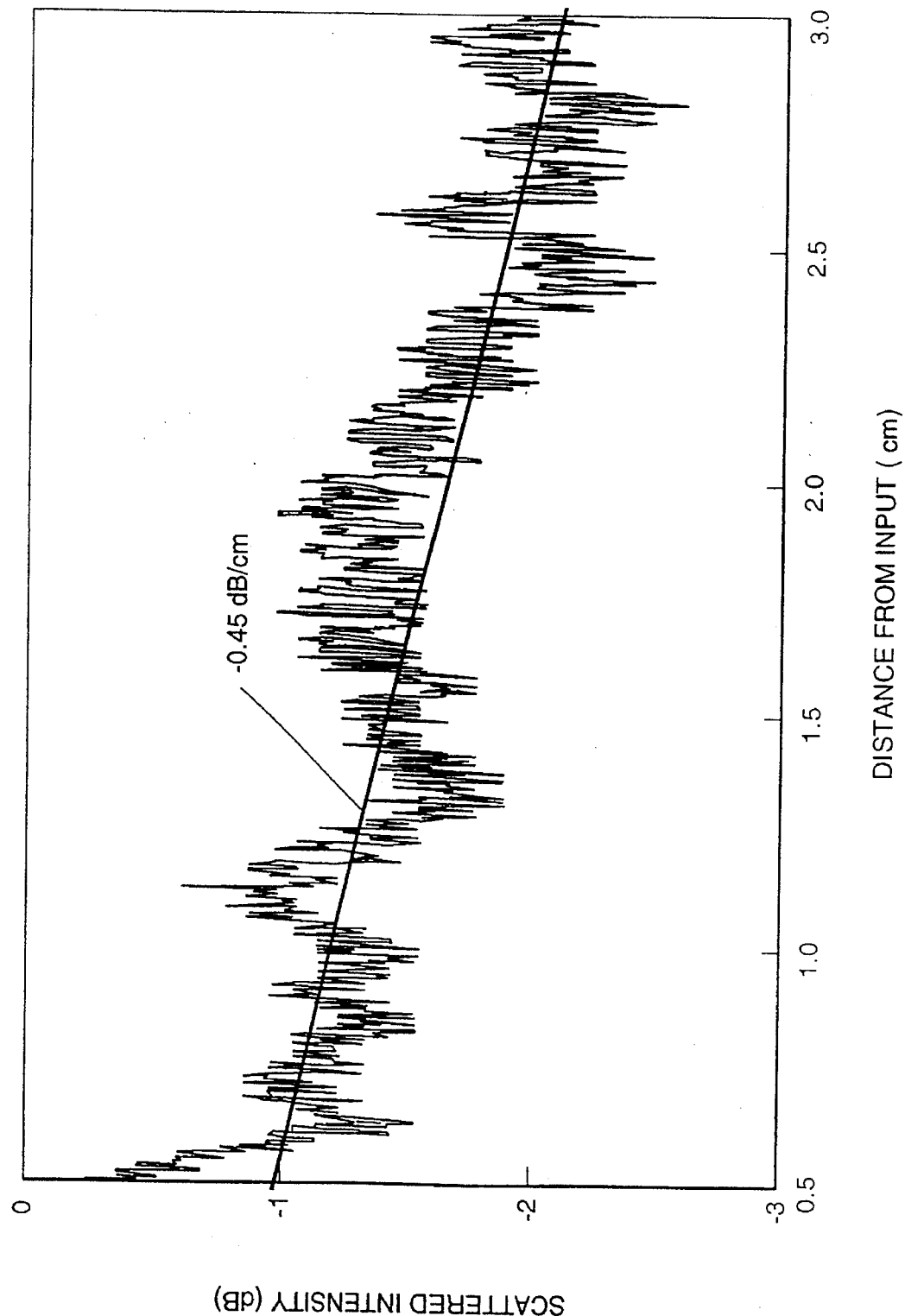
FIGS. 15, 16 and 17 show waveguide losses for several embodiments of the invention.
Figure 16:
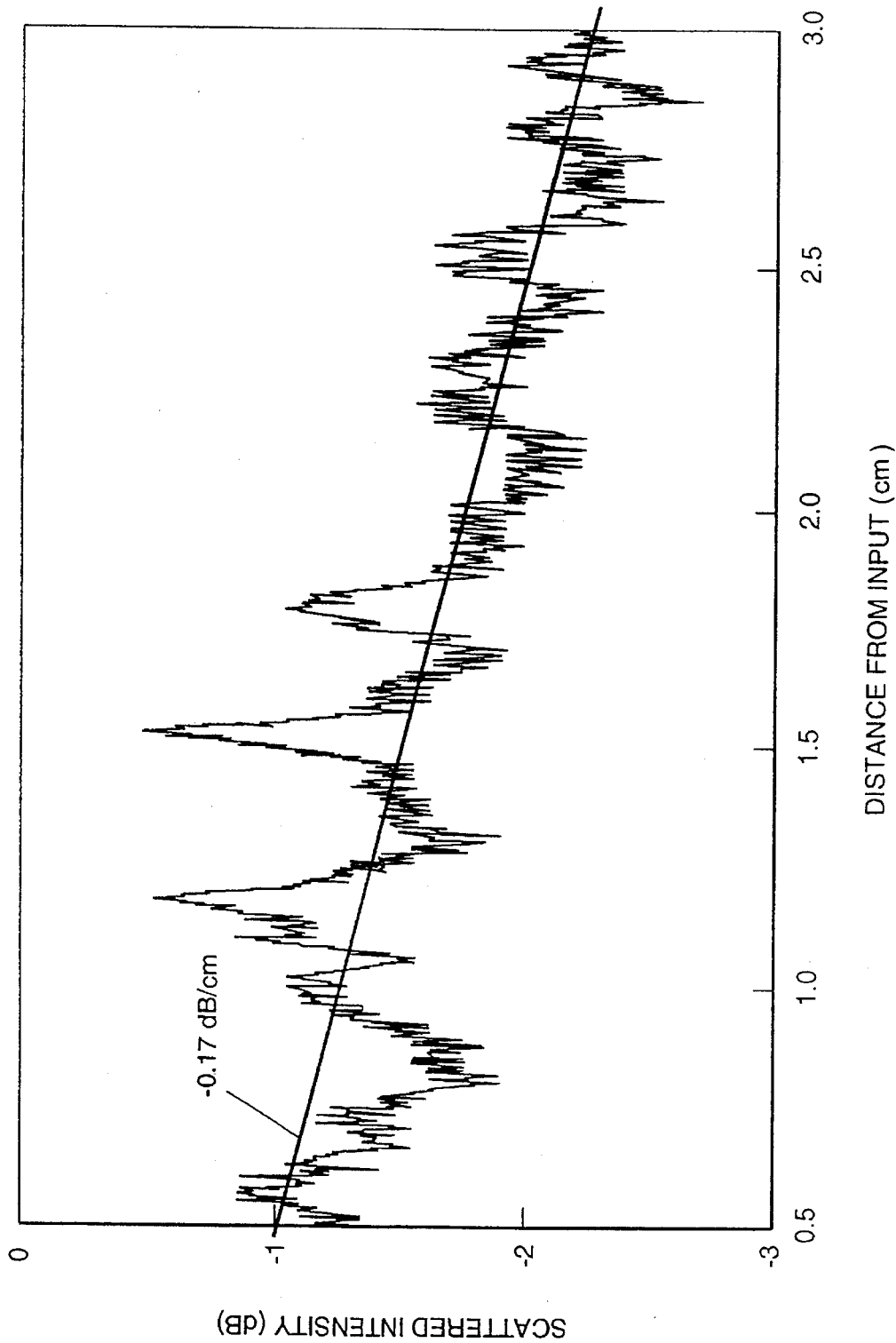
Figure 17:
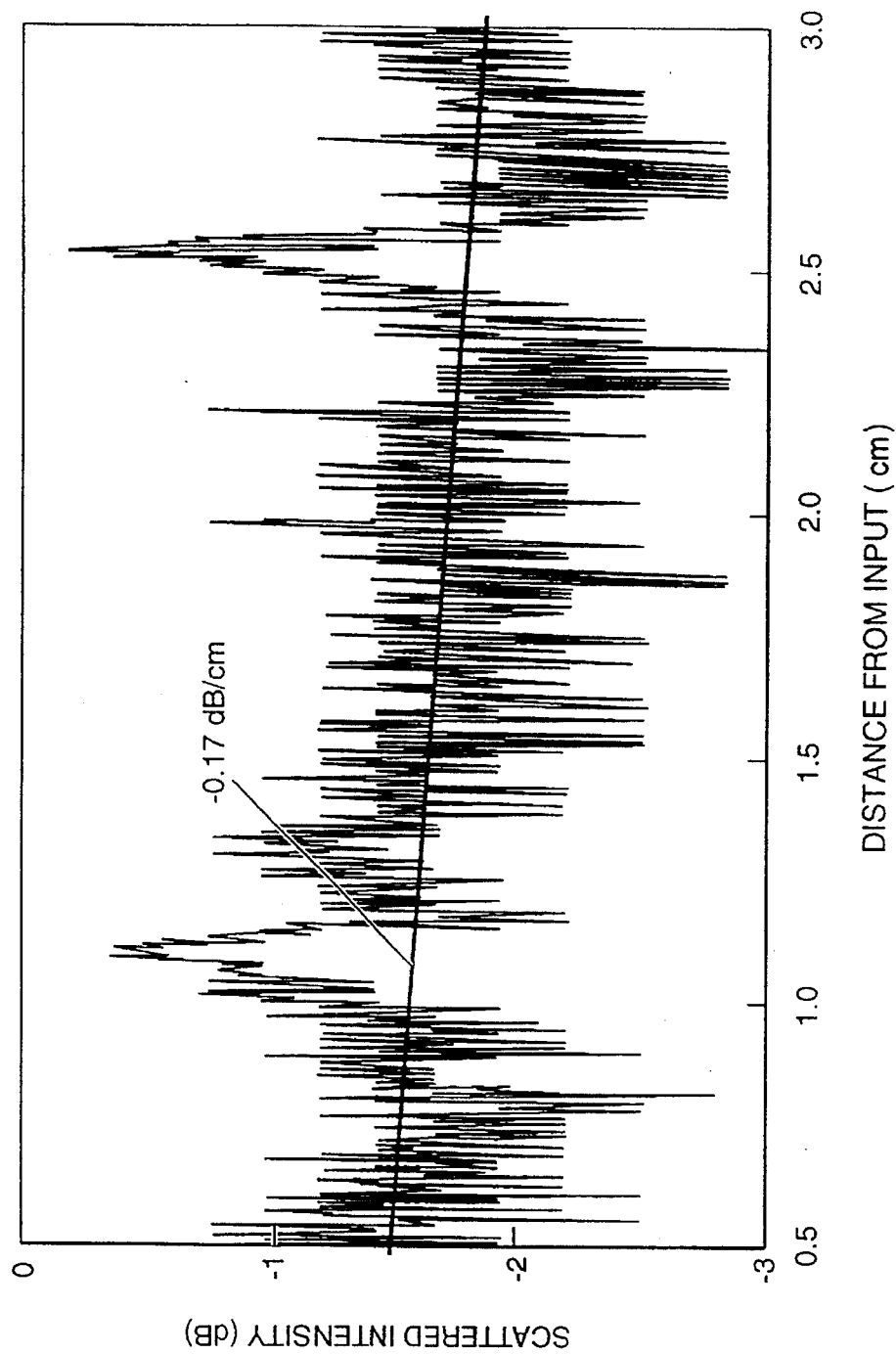
Figure 18:
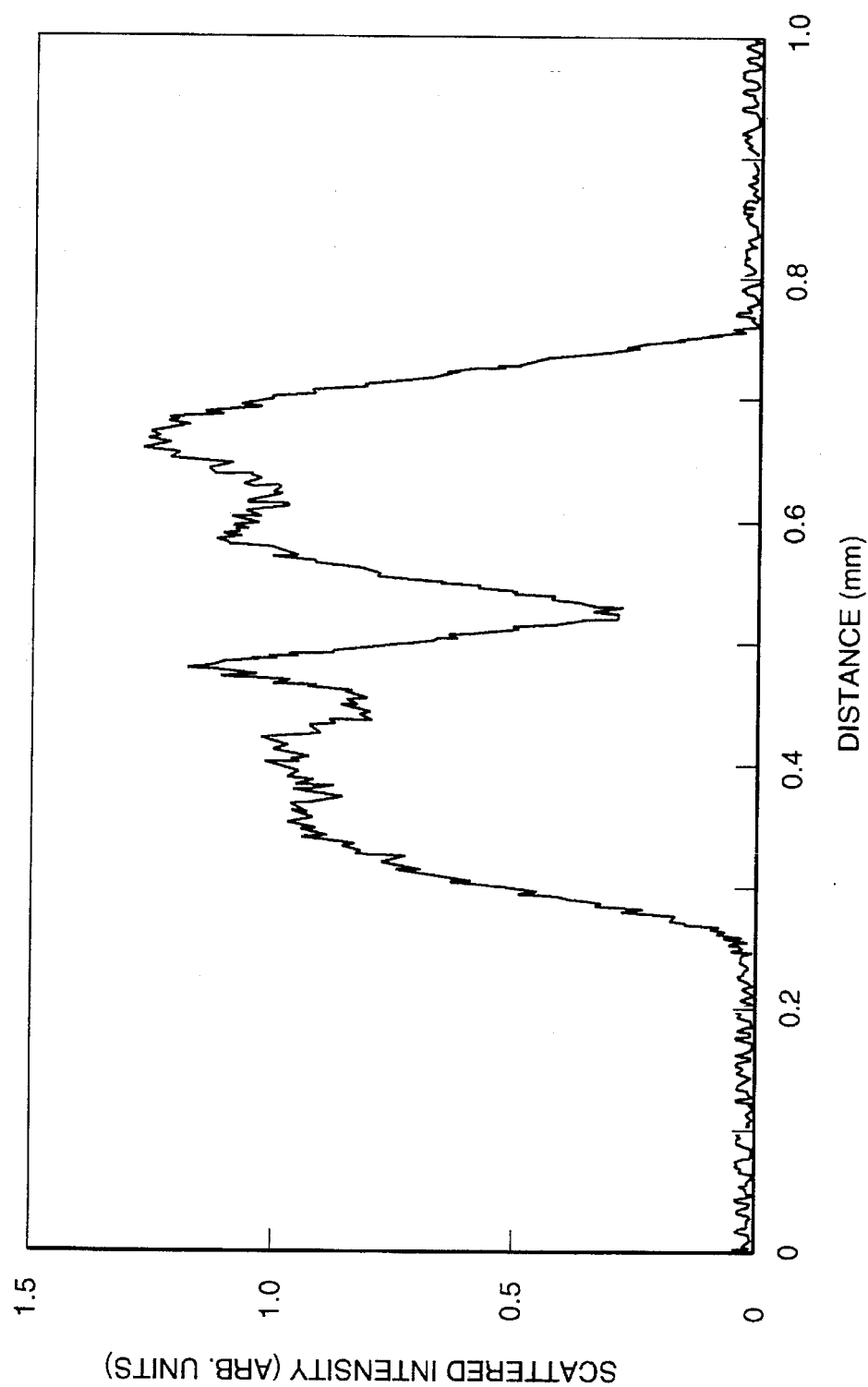
FIG. 18 shows an intensity distribution at output of a parallel waveguide splitter made in accordance with the invention.

Waveguide widths of less than 100 μm have been obtained by using the process of the invention, with excellent uniformity over several centimeters in length. FIG.15 shows waveguide loss measurement for single pass dispensed waveguide on planar substrate. Losses of 0.45 dB/cm at 633 nm were measured by monitoring the scattered power along the length of the waveguide. FIG. 16 shows waveguide loss measurement for a double pass dispensed waveguide on planar substrate (same polymer used for each pass). Losses of 0.5 dB/cm at 633 nm were measured by monitoring the scattered power along the length of the waveguide. Comparing this result to that in FIG. 15 we can see that there is no significant penalty in the quality of waveguides formed using the multistep technique. These waveguides offer the benefit of improved coupling to optical fibers and better alignment tolerance. Fig.17 shows waveguide loss measurement for double pass dispensed waveguide on planar substrate consisting of a high index polymer clad from above by a lower index polymer. Losses of 0.17 dB/cm at 633 nm were measured by monitoring the scattered power along the length of the waveguide. FIG. 18 shows the intensity distribution at output of the parallel waveguide splitter of FIGS. 12, 13 and 14.

The waveguides should not include any sharp bends and should be continuous and smooth. The xy translation stage should provide at least 1mm/sec travel speed. The waveguide forming process should occur in a clean environment. Splitters should be dispensed from output to input to reduce effects of surface tension. Input section should be cured on last pass only. Waveguide ends should be cleaved if using butt-coupling to fibers. For best results, input and output fibers should be secured with cores aligned to substrate surface prior to waveguide fabrication. Waveguides can then be dispensed from fiber to fiber, with the liquid attaching directly to the fiber ends thereby eliminating air gaps. This results in good refractive index matching between fiber and waveguide. Slight asymmetry is usually observed in Y-splitters due to effects of liquid surface tension during dispensing of second waveguide branch. This can be offset by making the splitter geometry slightly asymmetric. Waveguide cross-section exhibits a low height-to-width ratio when liquid is allowed to settle to steady state before curing. Higher ratios can be obtained by curing immediately after dispensing or by a multistep technique. Y-splitter junctions should be sharp in order to minimize excess losses. This can be achieved by immediate curing. Measures must be taken to prevent formation of liquid beads on the dispensing tip. A slight vacuum may be applied to the dispensing tip when the dispenser is in the OFF state to prevent bead formation.

The computer described in this application may be a NeXTStation running NeXTStep operating system version 2.1 or higher, available from NeXT Computer Inc., or compatible, the controller may be a Newport/Klinger MotionMaster 2000 with A/D, D/A option, the actuator may be a Newport/Klinger BMCC series with 76:1 gears, the translation stages may be Newport/Klinger MR series with 63 mm travel, the dispenser may be an EFD Inc., model 900 and the UV source may be an Ultracure 100ss, available from EFOS Inc., all of which products are commonly commercially available.

A person skilled in the art could make immaterial modifications to the invention described and claimed in this patent without departing from the essence of the invention.

The embodiments of the invention in which an exclusive property or privilege is claimed are defined as follows:

1. A method of forming an optical element on a substrate used for making optoelectronic circuits, the substrate having a surface layer, comprising the steps of:

controllably ejecting a first curable light guide forming liquid from a nozzle onto the surface layer in a defined pattern; and curing the first curable light guide forming liquid to form an optical element on the surface layer of the substrate, the optical element forming a light guide having the defined pattern for light passing through or along the substrate.

2. The method of claim 1 in which the defined pattern is a linear pattern, thereby forming a first waveguide having the linear pattern.

3. The method of claim 2 in which curing the first curable light guide forming liquid includes exposing the first curable light guide forming liquid to ultraviolet radiation.

4. The method of claim 3 in which only a central portion of the liquid is exposed to curing radiation.

5. The method of claim 1 further including:

ejecting a second curable light guide forming liquid onto the optical element and curing the second curable light guide forming liquid to form a stacked optical element.

6. The method of claim 2 further including ejecting a second curable light guide forming liquid, having a lower index of refraction than that of the first curable light guide forming liquid, onto the waveguide and curing the second curable light guide forming liquid, to form a cladding for the waveguide.

7. The method of claim 2 in which the nozzle includes a central aperture and an annular aperture formed about the central aperture, the method further including ejecting a second curable light guide forming liquid from the annular aperture while ejecting the first curable light guide forming liquid.

8. The method of claim 1 in which the first curable light guide forming liquid is ejected into a groove in the substrate.

9. The method of claim 2 in which the first curable light guide forming liquid is ejected into a groove in the substrate.

10. The method of claim 2 further including forming a branched waveguide pattern.

11. The method of claim 10 in which the branched waveguide pattern is formed by forming a first linear waveguide by the method of claim 1 using a first curable light guide forming liquid and forming a second linear waveguide parallel to the first linear waveguide by the method of claim 1 using the first curable light guide forming liquid and ejecting further of the first curable light guide forming liquid between and connecting the first and second linear waveguide.

12. The method of claim 1 in which the nozzle is not moved while ejecting the first curable light guide forming liquid, whereby a lens is formed.

13. A method of forming an optical element on a substrate, the substrate having a surface layer with an index of refraction $n_1$, the method comprising the steps of:

controllably ejecting a first curable light guide forming liquid from a nozzle onto the surface layer;

moving the nozzle in a linear pattern over the surface layer of the substrate while ejecting the first curable light guide forming liquid from the nozzle; and curing the first curable light guide forming liquid to form an optical waveguide on the surface layer of the substrate for guiding light along the linear pattern, the optical waveguide having an index of refraction $n_2$ greater than $n_1$.

14. The method of claim 13 in which curing the first curable light guide forming liquid includes exposing the first curable light guide forming liquid to ultraviolet radiation.

15. The method of claim 14 in which only a central portion of the liquid is exposed to curing radiation.

16. The method of claim 13 further including:

ejecting a second curable light guide forming liquid onto the optical element and curing the second curable light guide forming liquid to form a stacked optical element.

17. The method of claim 13 further including ejecting a second curable light guide forming liquid, having a lower index of refraction than that of the first curable light guide forming liquid, onto the waveguide and curing the second curable light guide forming liquid, to form a cladding for the waveguide.

18. The method of claim 13 in which the nozzle includes a central aperture and an annular aperture formed about the central aperture, the method further including ejecting a second curable light guide forming liquid from the annular aperture while ejecting the first curable light guide forming liquid, whereby the second curable light guide forming liquid forms a surface layer of the substrate on top of which the first curable light guide forming liquid forms an optical waveguide.

19. The method of claim 13 in which the first curable light guide forming liquid is ejected into a smooth sided groove in the substrate.

20. The method of claim 13 further including forming a branched waveguide pattern.

21. The method of claim 20 in which the branched waveguide pattern is formed by forming a first linear waveguide by the method of claim 1 using a first curable light guide forming liquid and forming a second linear waveguide parallel to the first linear waveguide by the method of claim 1 using the first curable light guide forming liquid and ejecting further of the first curable light guide forming liquid between and connecting the first and second linear waveguide.

22. The method of claim 13 further including forming the surface layer of the substrate by ejecting a second curable light guide forming liquid onto the substrate.

23. The method of claim 22 in which the second curable light guide forming liquid is ejected in the linear pattern.

24. The method of claim 23 in which the second curable light guide forming liquid is ejected into a smooth sided groove in the substrate.

25. The method of claim 13 further including forming the surface layer of the substrate by chemical vapour deposition of a layer having an index of refraction lower than $n_2$.

26. The method of claim 13 further including forming reflective taps in the optical waveguide by ejecting drops of reflective material onto the surface layer before ejecting the first curable light guide forming liquid onto the surface layer.

27. The method of claim 13 in which the optical waveguide is formed with a reflective end by providing an end of the optical waveguide with a reflective material.

28. The method of claim 13 in which the optical waveguide is formed in layers.

29. A method of forming an optical element on a substrate used for making optoelectronic circuits, the substrate having a surface layer, comprising the steps of:

controllably ejecting a first curable light guide forming liquid from a nozzle onto the surface layer; and curing the first curable light guide forming liquid to form a microlens on the surface layer of the substrate, the optical element forming a light guide for light passing through the substrate.

* * * * *